(12) United States Patent
Kuo

(10) Patent No.: US 9,506,241 B1
(45) Date of Patent: Nov. 29, 2016

(54) BUILDING WITH ROTATING HOUSINGS

(71) Applicant: Yi-Chen Kuo, Taipei (TW)

(72) Inventor: Yi-Chen Kuo, Taipei (TW)

(*) Notice: Subject to any disclaimer, the term of this patent is extended or adjusted under 35 U.S.C. 154(b) by 0 days.

(21) Appl. No.: 14/932,404

(22) Filed: Nov. 4, 2015

(51) Int. Cl.
*E04B 2/82* (2006.01)
*E04B 1/34* (2006.01)
*E04B 1/346* (2006.01)
*E04B 1/00* (2006.01)
*F16D 55/02* (2006.01)
*F16D 61/00* (2006.01)

(52) U.S. Cl.
CPC .......... *E04B 1/346* (2013.01); *E04B 1/34* (2013.01); *E04B 2001/0053* (2013.01); *F16D 55/02* (2013.01); *F16D 61/00* (2013.01)

(58) Field of Classification Search
CPC ...... E04B 2/82; E04B 2/827; E04B 1/34384; E04B 1/343; E04B 1/34363; E04B 1/34; E04H 4/065; E04H 3/00; E04H 3/02; E04H 5/00
USPC .......................................... 52/64, 65, 71, 72
See application file for complete search history.

(56) References Cited

U.S. PATENT DOCUMENTS

| | | | | |
|---|---|---|---|---|
| 1,426,197 A * | 8/1922 | Kannenberg | ............ | E04B 1/346 52/65 |
| 3,125,189 A * | 3/1964 | Graham | .................. | E04B 1/346 52/247 |
| 3,895,495 A * | 7/1975 | Akazaki | .................. | B63B 35/44 114/66 |
| 5,113,974 A * | 5/1992 | Vayda | .................... | B65G 1/045 186/36 |
| 2006/0230691 A1* | 10/2006 | Fisher | ..................... | E04B 1/346 52/65 |

* cited by examiner

*Primary Examiner* — Phi A
(74) *Attorney, Agent, or Firm* — Birch, Stewart, Kolasch & Birch, LLP

(57) ABSTRACT

A building with rotating housings has a main structure and multiple housing units. The main structure has a structure body, a housing track extending spirally upward outside of the structure body, and a temporary track moveably mounted in the structure body. When changing positions of the housing units, braking devices of all the housing units are released temporarily to make the housing units slide down by gravity along the housing track for a distance of one housing unit, and the housing unit at the lowest position slides to the temporary track. Then the temporary track and said housing unit are moved upward. Finally the braking device of said housing unit is released temporarily to make said housing unit slide down to the housing track to be the highest housing unit. The housing units can change their positions, heights, and angles at regular or predetermined timeline.

15 Claims, 13 Drawing Sheets

BUILDING WITH ROTATING HOUSINGS

BACKGROUND OF THE INVENTION

1. Field of the Invention

The present invention relates to a building with multiple spirally rotating housings.

2. Description of the Prior Arts

A conventional apartment building includes multiple housings for different families or individuals to live in. But positions, heights and angles of the housings are stationary and thus residents in the housings can only see the same mundane views through their windows from the same dull perspective. Particularly for those who are located in the lower housing units, the views they can see are always blocked.

To overcome the shortcomings, the present invention provides a building with rotating housings to mitigate or obviate the aforementioned problems.

SUMMARY OF THE INVENTION

The main objective of the present invention is to provide a building with rotating housings that can be moved spirally downward around a main structure at a predetermined and regular timeline.

The building with rotating housings has a main structure, a moving device, multiple housing units, and a control system. The main structure has a structure body, a housing track, and a temporary track. The structure body has an entrance opening and an exit opening. The housing track is mounted on an outer surface of the structure body, and extends spirally upward from the entrance opening to the exit opening. The temporary track is moveably mounted in the structure body. The housing units are moveably mounted on the housing track, and each of the housing units has a braking device. When changing the positions of the housing units, the moving device moves the temporary track out of the entrance opening. Then the braking devices of all the housing units are released temporarily to make the housing units slide down by gravity along the housing track for a distance of one housing unit, and the housing unit that is at the lowest position slides to the temporary track. Then the moving device moves the temporary track and said housing unit upward and out of the exit opening. Finally, the braking device of said housing unit is released temporarily to make said housing unit slide down to the housing track to be the highest housing unit.

Thus, the housing units can change their positions, heights, and angles by sliding along the housing track at regular or predetermined timeline, such as every multiple hours, every day, every week and so on. Consequently, residents living in the housing units can see different views along with the rotation cycle of the building, and particularly all the residents have the same chance to see unblocked views.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
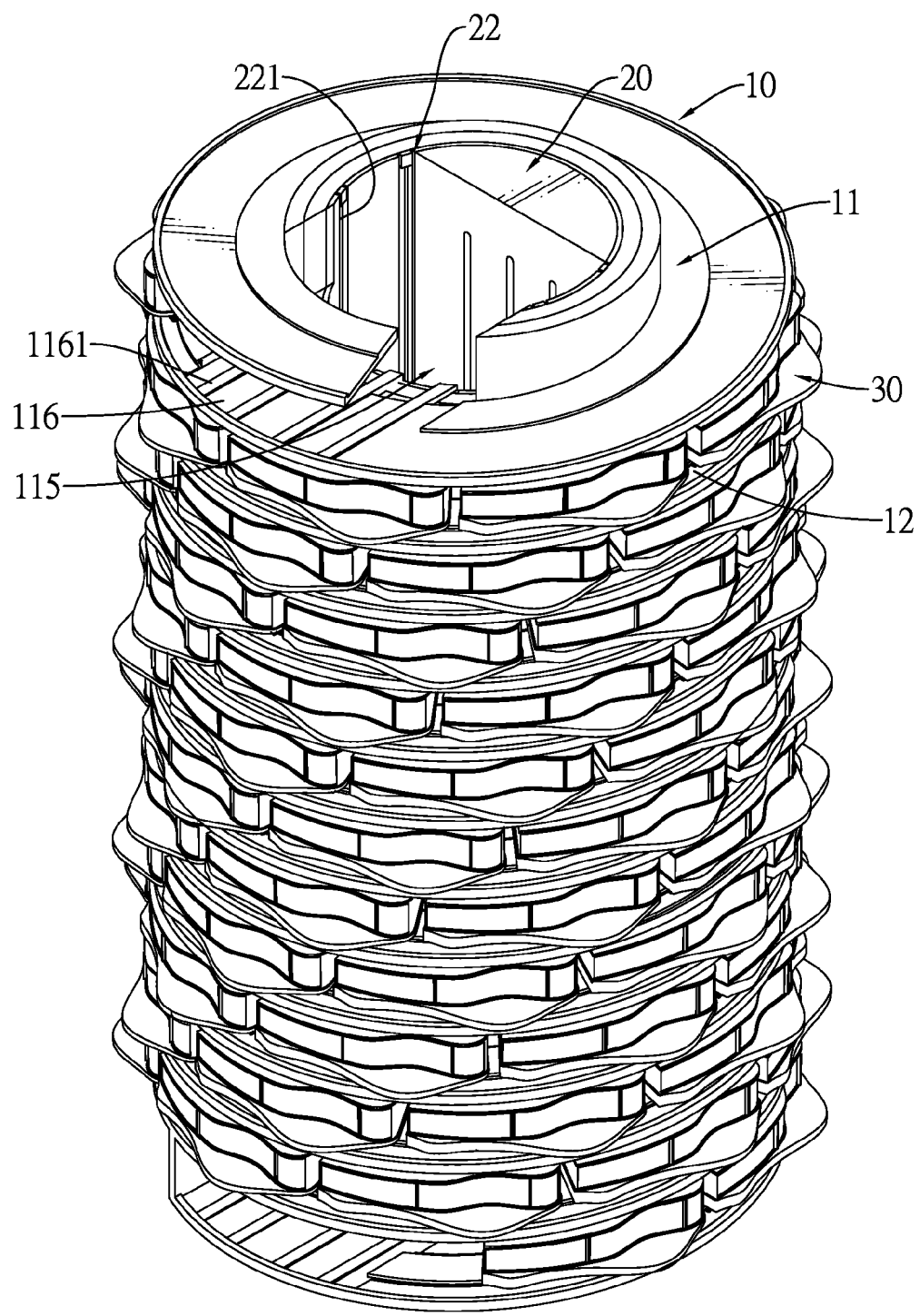
FIG. 1 is a perspective view of a building with rotating housings in accordance with the present invention.
Figure 2:
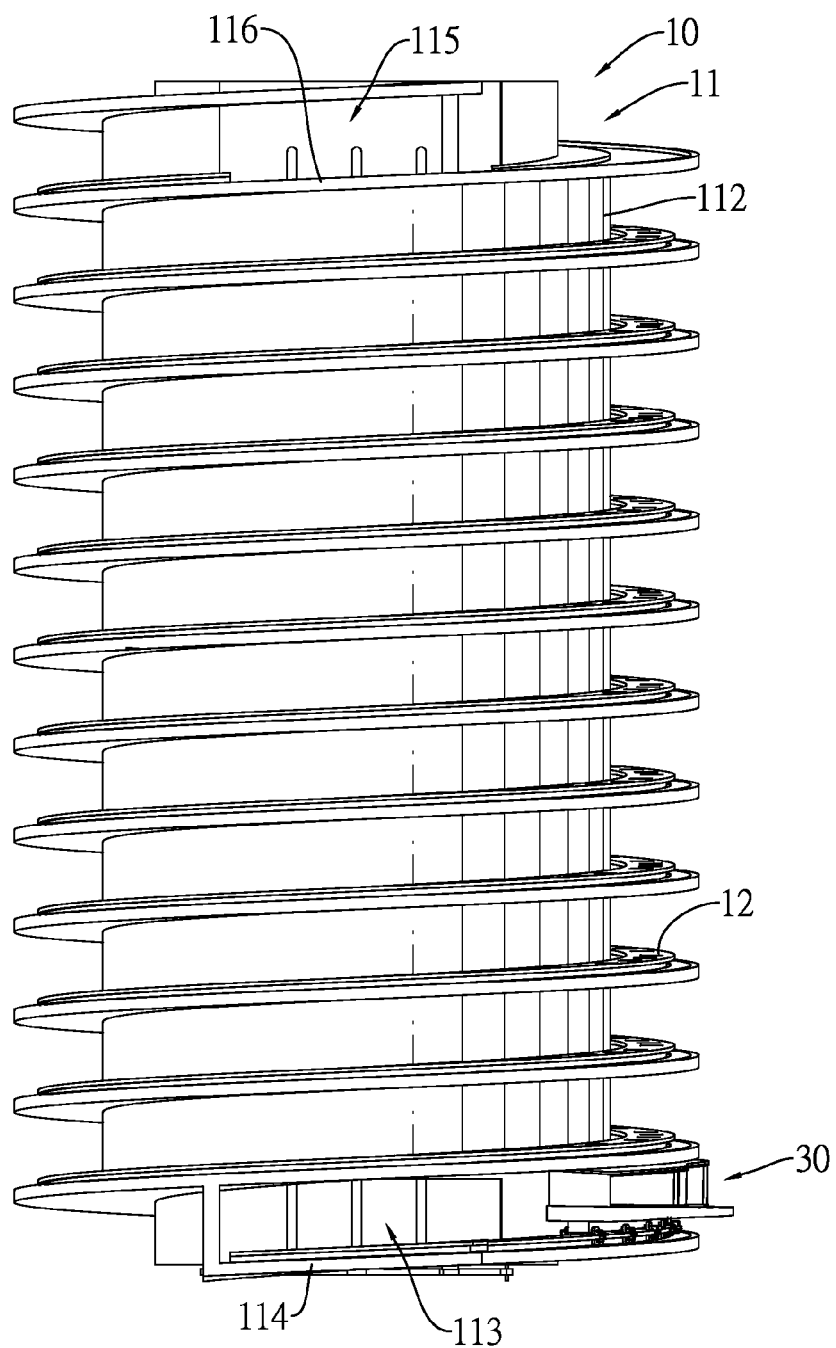
FIG. 2 is a front view of the building with rotating housings in FIG. 1.

With reference to FIGS. 1 and 2, a building with rotating housings in accordance with the present invention comprises a main structure 10, a moving device 20, multiple housing units 30, and a control system.

With reference to FIGS. 1 to 3 and 7, the main structure 10 has a structure body 11, a housing track 12, and a temporary track 13.

The structure body 11 is circular and hollow, and has an inner surrounding wall 111, an outer surrounding wall 112, an entrance opening 113, an entrance plate 114, an exit opening 115, an exit plate 116, a floor 117 and multiple elevators 118.

The inner surrounding wall 111 is circular.

The outer surrounding wall 112 is circular, is mounted around the inner surrounding wall 111, and has multiple doors 119, which are spirally arranged apart from each other The entrance opening 113 is transversely formed through the surrounding walls 111, 112, and is adjacent to a bottom of the structure body 11.

The entrance plate 114 is formed on the outer surrounding wall 112, is disposed out of the entrance opening 113, and has multiple guiding tracks 1141 on a top surface of the entrance plate 114.

The exit opening 115 is formed transversely through the surrounding walls 111, 112, and is adjacent to a top of the structure body 11.

The exit plate 116 is formed on the outer surrounding wall 112, is disposed out of the entrance opening 113, and has multiple guiding tracks 1161 on a top surface of the exit plate 116.

The floor 117 is mounted between the surrounding walls 111, 112 and extends spirally upward. The spaces between the surrounding walls 111, 112 and the floor 117 are corridors for residents of the building.

The elevators 118 are mounted in the inner surrounding wall 111, and doors of the elevator 118 are positioned towards the corridors.

With reference to FIGS. 1 to 3, 7 and 11, the housing track 12 is mounted on an outer surface of the outer surrounding wall 112, extends spirally upward from the entrance plate 114 to the exit plate 116, and corresponds in position to the floor 117. The housing track 12 has two flanges 121 and multiple positioning recess sets 122. The flanges 121 respectively are formed transversely on two sides of the housing track 12, and are aligned with a top of the housing track 12. The positioning recess sets 122 are formed in the top of the housing track 12 and are spirally arranged apart from each other. Each positioning recess set 122 has multiple positioning recesses 1221.

The temporary track 13 is moveably mounted in the structure body 11, and is selectively connected to a top end of the housing track 12 via the exit plate 116 or a bottom end of the housing track 12 via the entrance plate 114. The temporary track 13 is same with the housing track 12 in shape, and thus also has flanges and positioning recesses.

Figure 3:
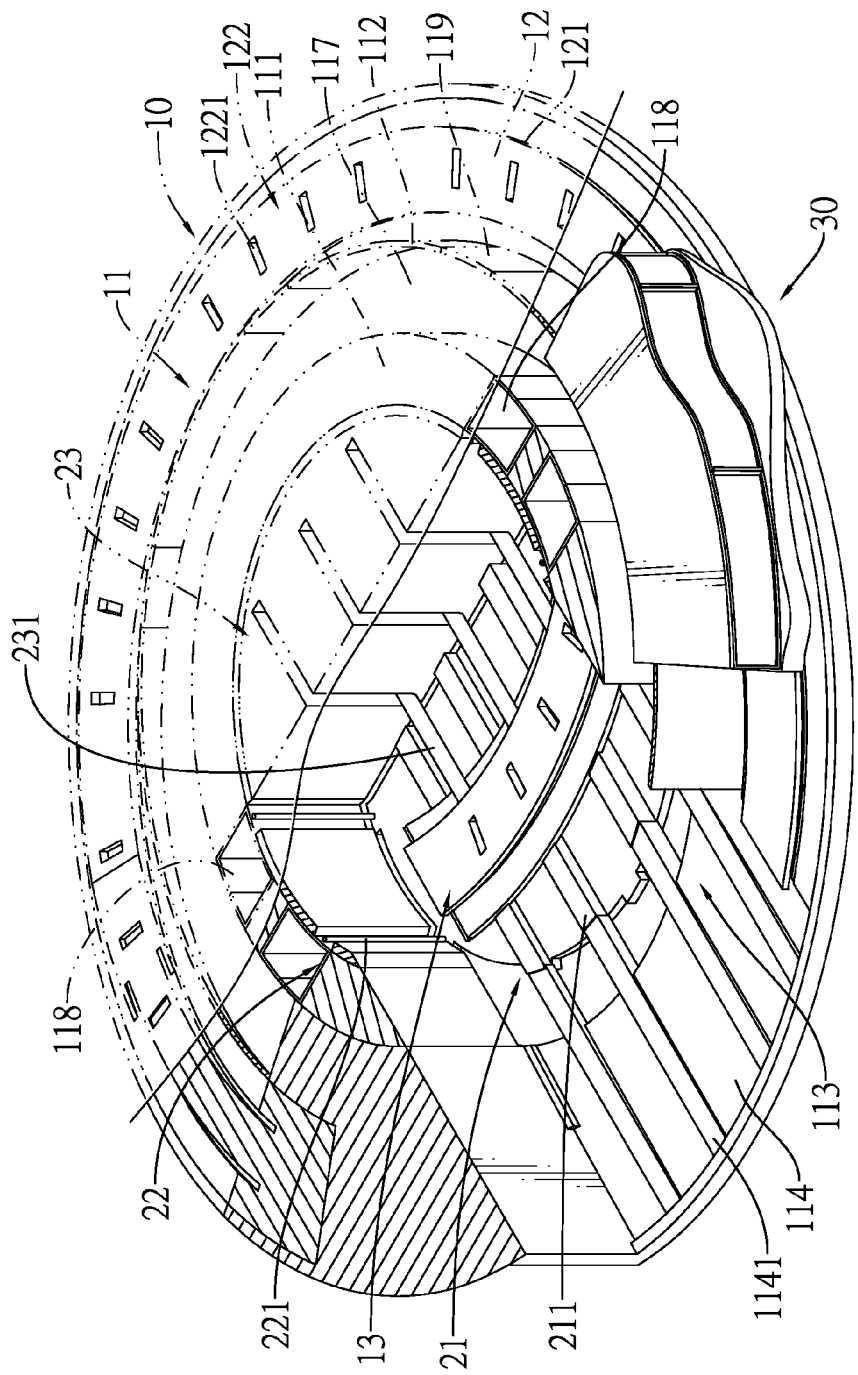
FIGS. 3 to 9 are operational perspective views of the building with rotating housings in FIG. 1, showing a movement of a housing unit.
Figure 7:
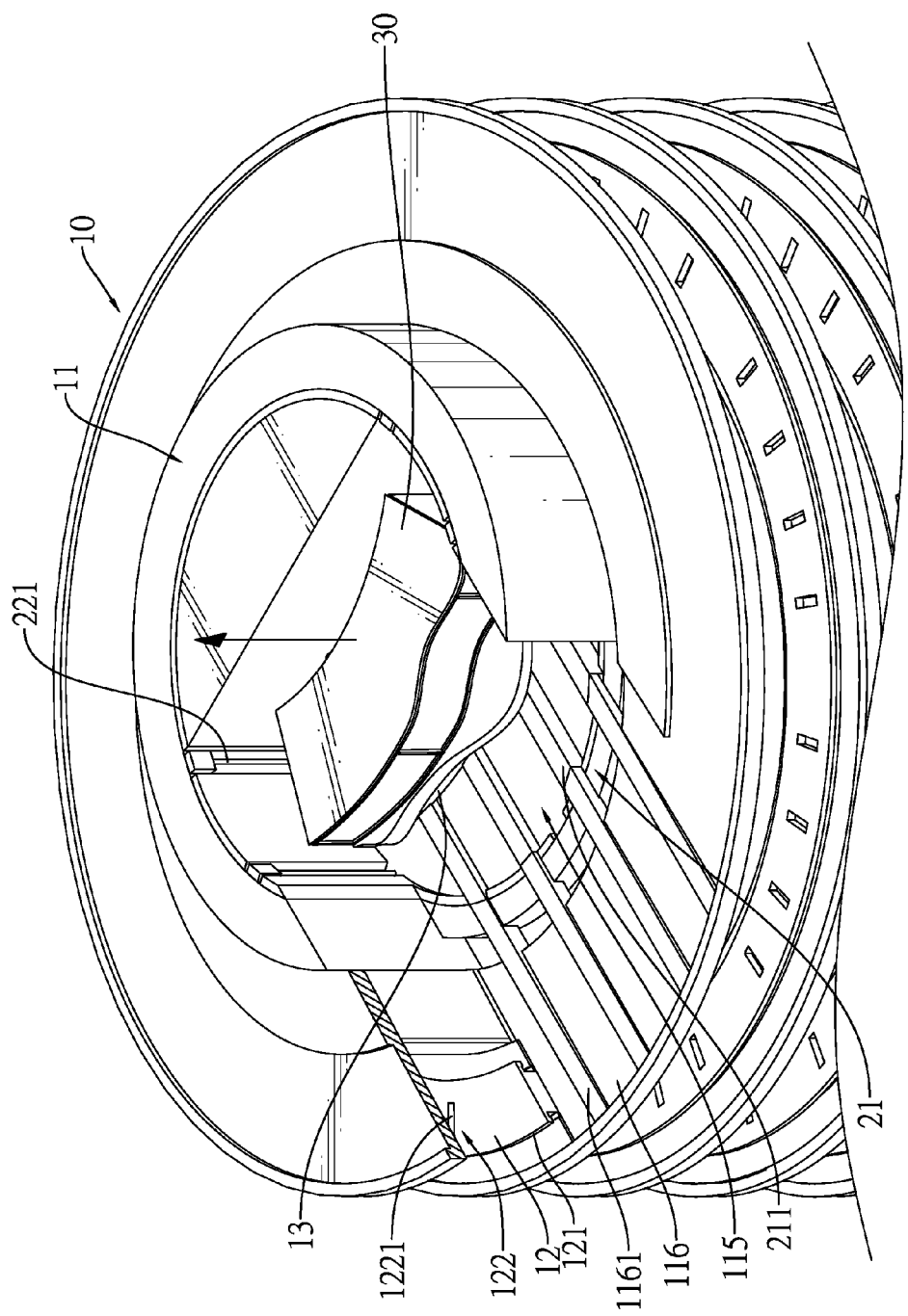

With reference to FIGS. 1, 3 and 7, the moving device 20 is mounted on the structure body 11, is capable of moving the temporary track 13 up and down in the structure body 11, and is capable of moving the temporary track 13 in and out through the entrance opening 113 and the exit opening 115. In the preferred embodiment, the moving device 20 has an elevatable plate 21, a vertical moving part 22, and a transverse moving part 23.

With reference to FIGS. 3 and 7, the elevatable plate 21 is vertically and moveably mounted in the inner surrounding wall 111, and has multiple guiding tracks 211. The guiding tracks 211 are on a top surface of the elevatable plate 21.

The vertical moving part 22 is mounted on the top of the structure body 11 and has multiple cables 221, which extend downward to connect the elevatable plate 21 to move the elevatable plate 21 upward or downward.

With reference to FIG. 3, when the elevatable plate 21 is moved to the bottom of the structure body 11, the elevatable plate 21 is connected to the entrance plate 114, and the guiding tracks 211 of the elevatable plate 21 and the guiding tracks 1141 of the entrance plate 114 are connected to each other.

With reference to FIG. 7, when the elevatable plate 21 is moved to the top of the structure body 11, the elevatable plate 21 is connected to the exit plate 116, and the guiding tracks 211 of the elevatable plate 21 and the guiding tracks 1161 of the exit plate 116 are connected to each other.

Figure 5:
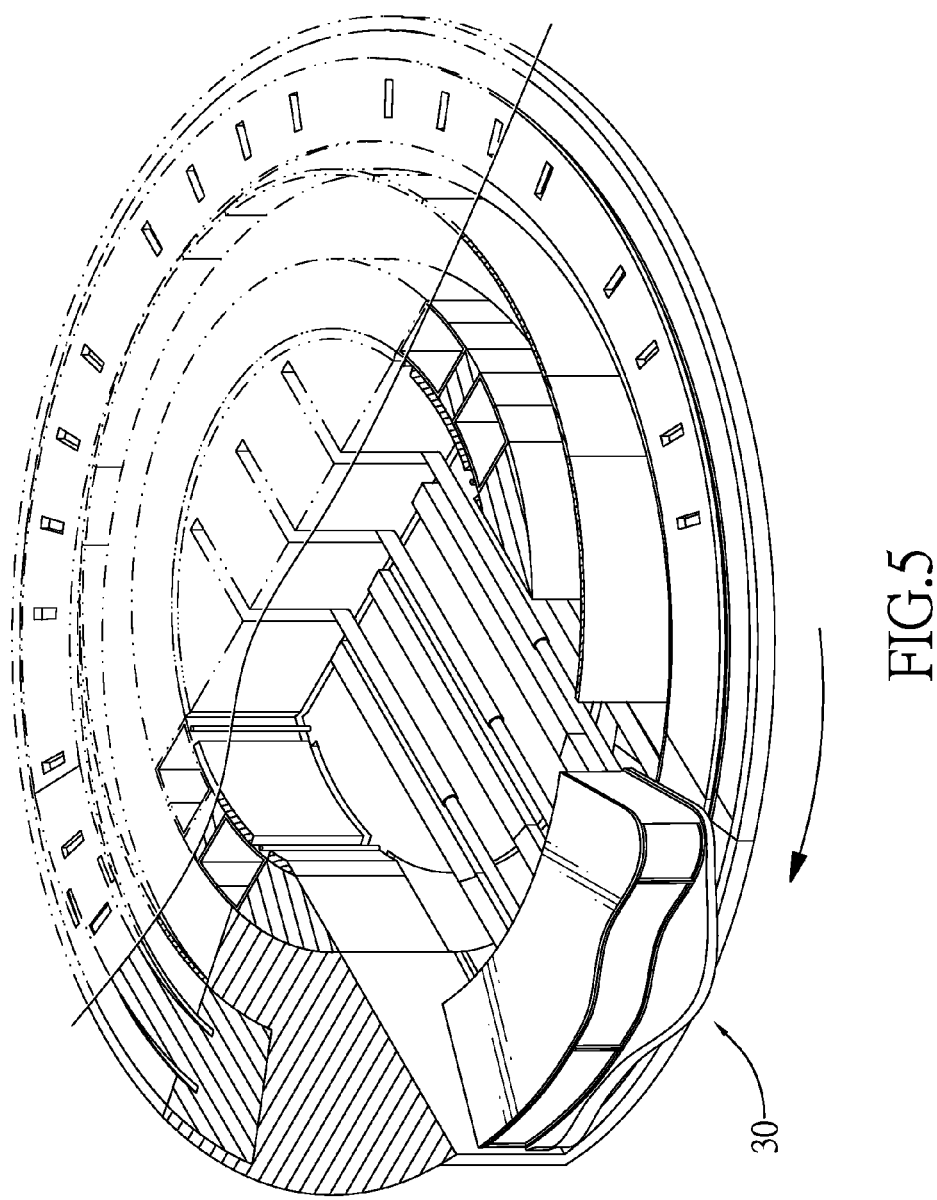
Figure 9:
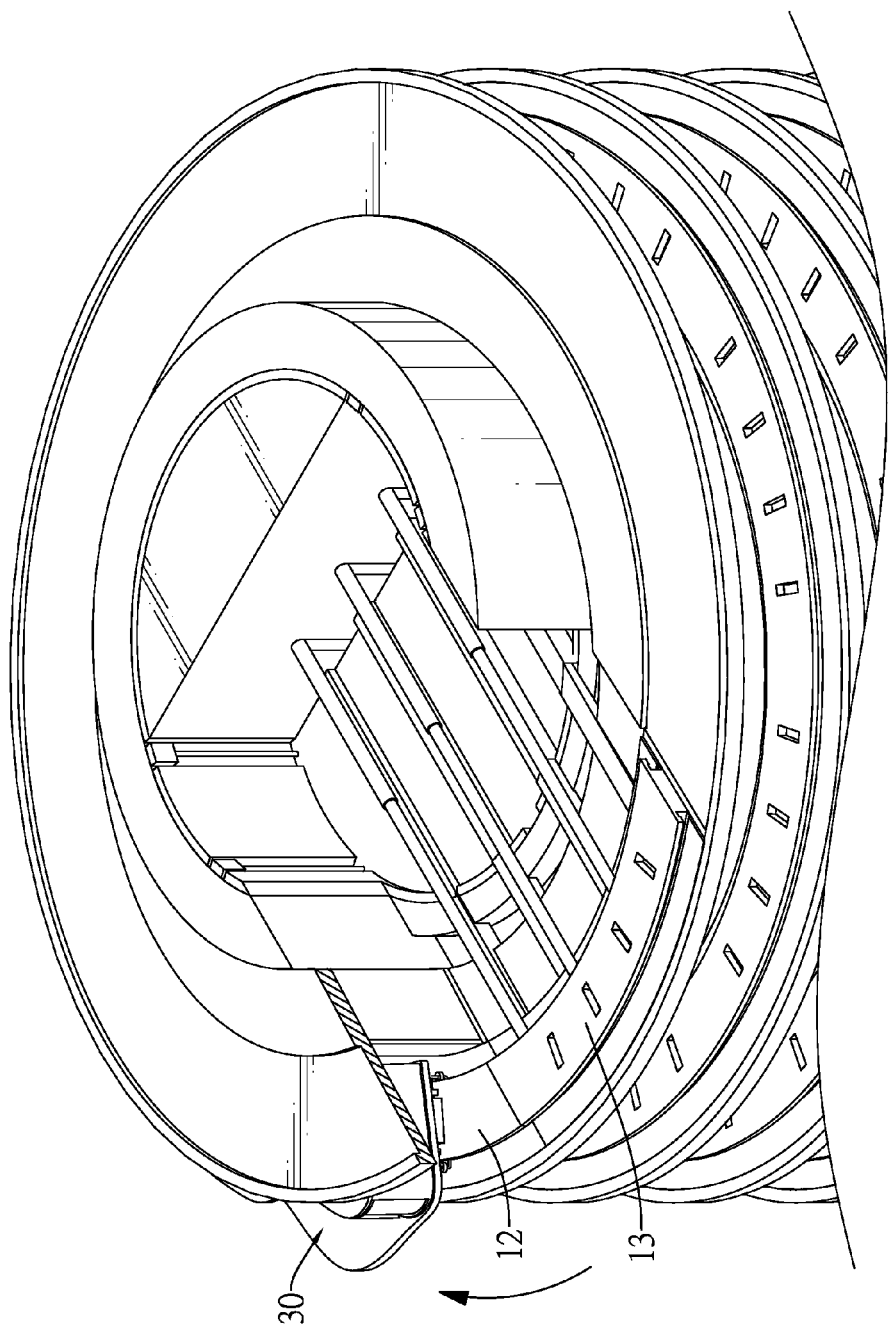

With reference to FIGS. 3, 5 and 9, the temporary track 13 is moveable between the elevatable plate 21 and the housing track 12.

Figure 4:
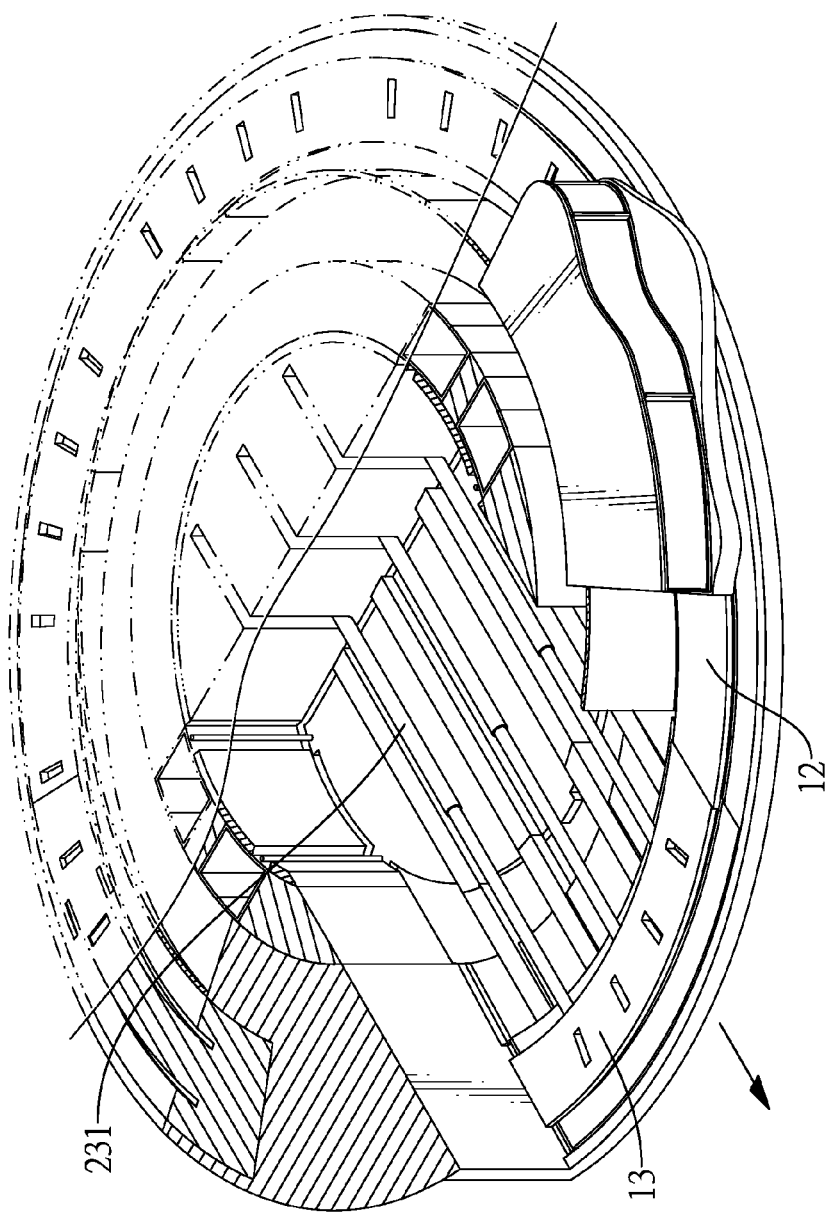
Figure 6:
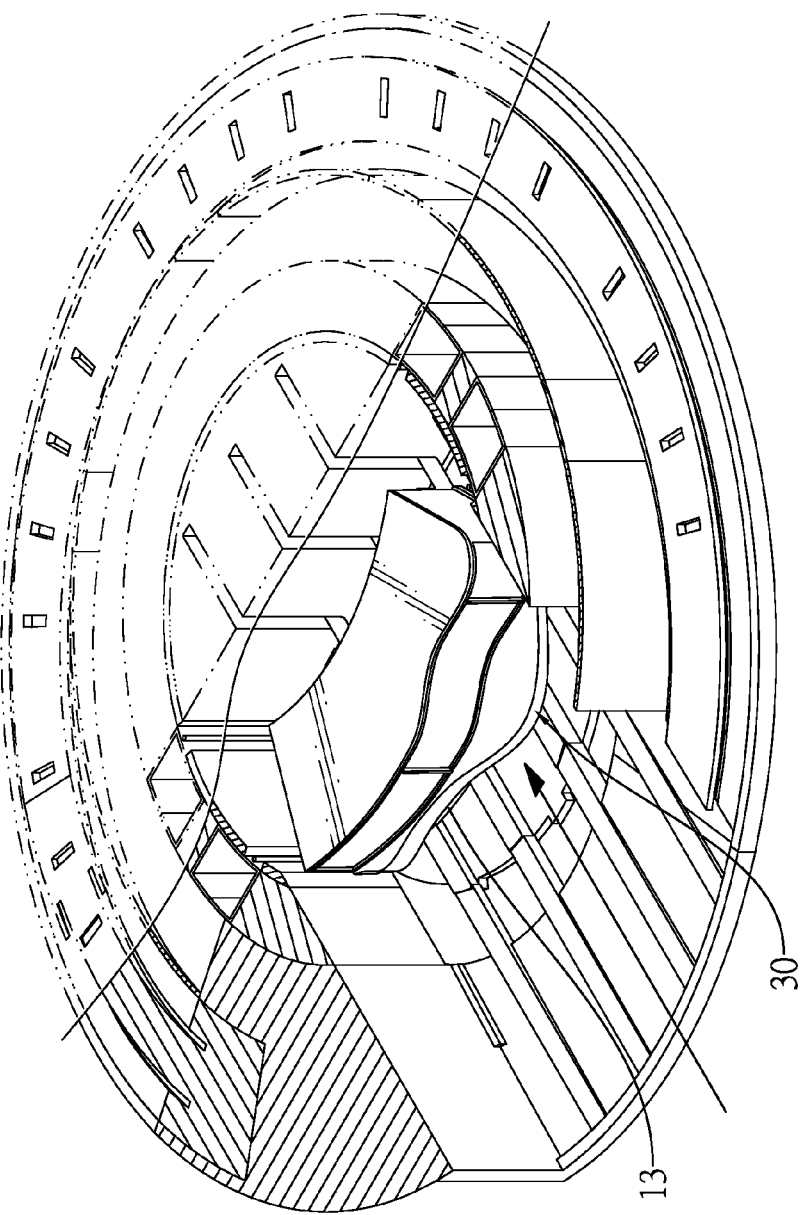
Figure 8:
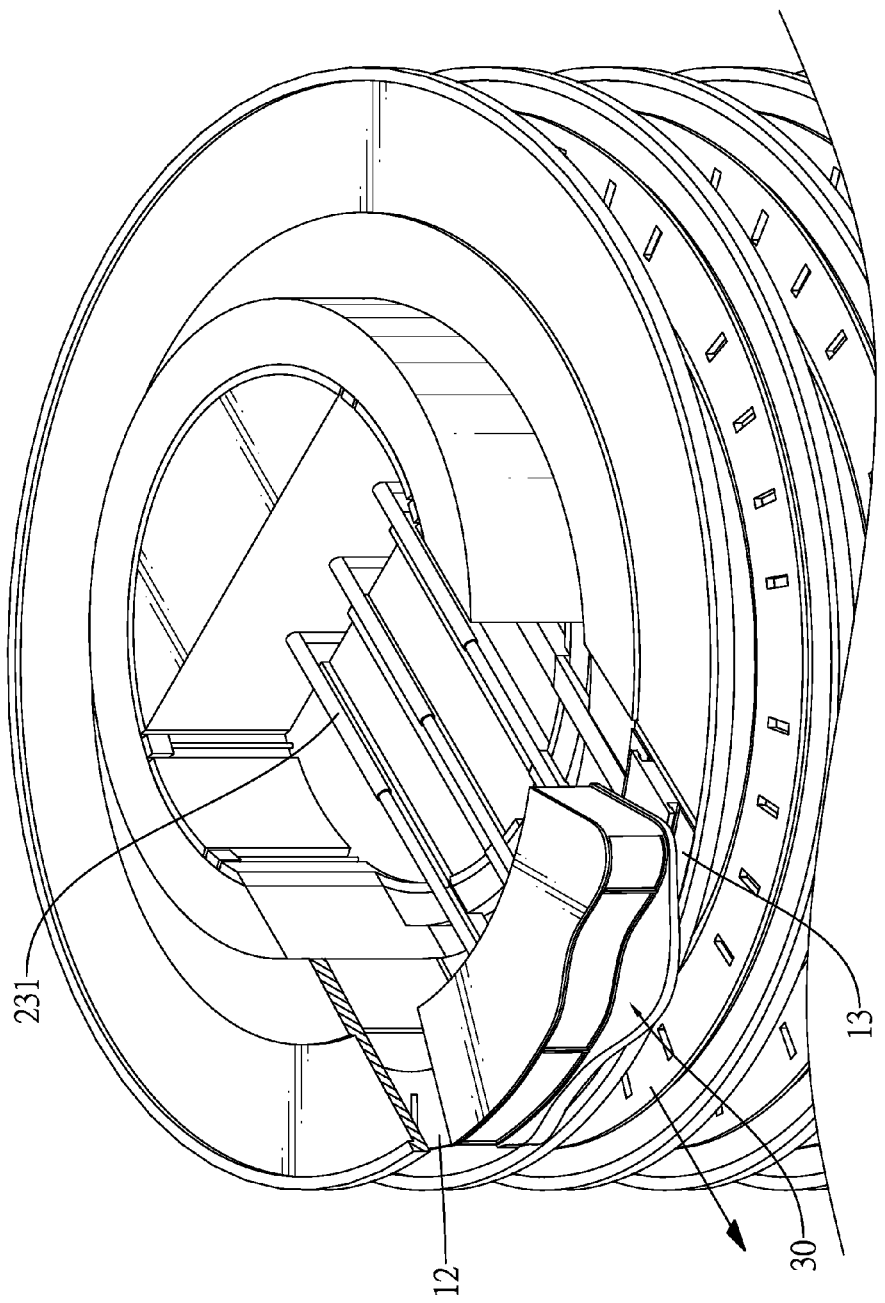

With reference to FIGS. 4, 6 and 8, the transverse moving part 23 is vertically and moveably mounted on the inner surrounding wall 111, and has multiple moving rods 231. The moving rods 231 are connected securely to the temporary track 13 to transversely move out the temporary track 13 to the entrance plate 114 or the exit plate 116, or to transversely move the temporary track 13 into the elevatable plate 21.

Figure 10:
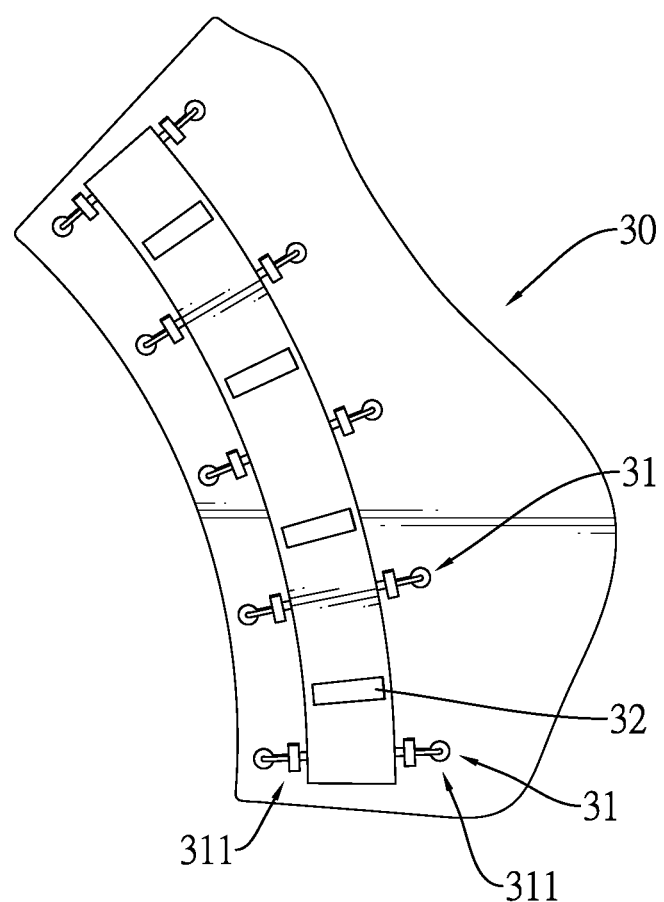
FIG. 10 is a bottom view of the housing unit of the building with rotating housings in FIG. 1.
Figure 11:
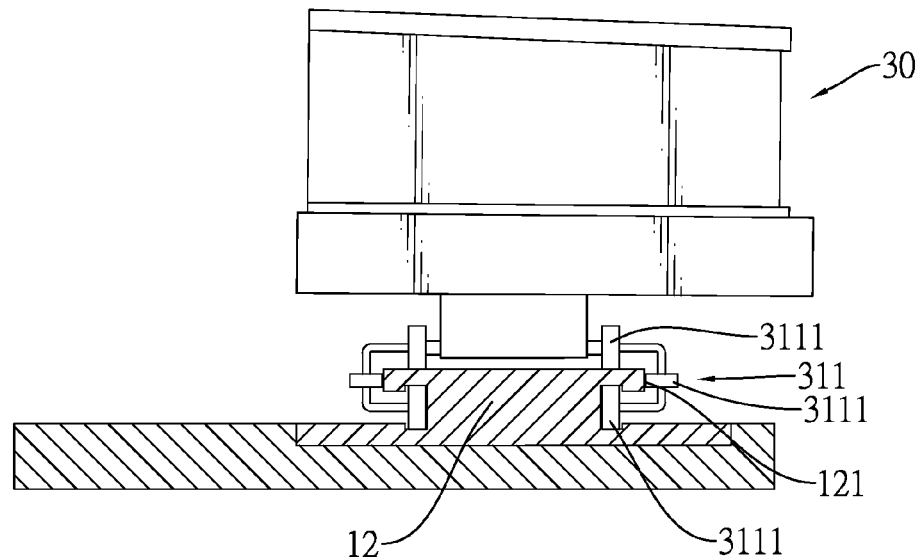
FIG. 11 is a schematic view of the building with rotating housings in FIG. 1, showing rollers on flanges of a housing track.

With reference to FIGS. 3, 10 and 11, the housing units 30 are moveably mounted on the housing track 12. Each of the housing units 30 is a curved housing with radian corresponding to the outer surrounding wall 112. Each of the housing units 30 has a door corresponding to one of the doors 119 on the outer surrounding wall 112.

Each of the housing units 30 has multiple roller sets 31, a braking device (not shown in the figures), multiple positioning protrusions 32, and a regenerative-braking device (not shown in the figures).

The roller sets 31 are mounted on a bottom of the housing unit 30, are spirally arranged apart from each other, and abut on the housing track 12. Each of the roller sets 31 has two roller members 311 respectively corresponding to the two flanges 121 of the housing track 12, and each of the roller members 311 has three rollers 3111. The three rollers 3111 respectively and rotatably abut a top, an outer side, and a bottom of the corresponding flange 121.

The braking device is mounted on the bottom of the housing unit 30, and is capable of stopping the housing unit 30 from sliding down along the housing track 12. The braking device has multiple disc brakes (not shown in the figures) and multiple positioning protrusions 32. The disc brakes are mounted on the roller sets 31, and particularly are disposed adjacent to the rollers 3111.

The regenerative-braking device is mounted on the housing unit 30 and is connected to the braking device. When the braking device is released and the housing unit 30 is sliding, the regenerative-braking device can transfer the kinetic energy of the housing unit 30 into electric power to charge a battery. When the braking device is actuated and the sliding of the housing unit 30 gradually slows down, the regenerative-braking system can transfer the braking energy into electric power to charge the battery.

The housing units 30 respectively correspond to the positioning recess sets 122 of the housing track 12. The positioning protrusions 32 are vertically and moveably mounted on the bottom of the housing unit 30. When the housing unit 30 stops sliding, the positioning protrusions 32 are respectively mounted into the positioning recesses 1221, thereby further strengthening the fix between the housing unit 30 and the housing track 12. When the housing unit 30 slides, the positioning protrusions 32 are moved out of said positioning recesses 1221.

The control system is electrically connected to and controls the moving device 20 and the braking devices and the positioning protrusions 32 of the housing units 30.

With reference to FIG. 3, when changing the positions of the housing units 30, the vertical moving part 22 moves down the elevatable plate 21. With reference to FIG. 4, then the transverse moving part 23 moves the temporary track 13 to the entrance plate 114. With reference to FIG. 5, then the positioning protrusions 32 of the all the housing units 30 are moved out of the positioning recesses 1221, and the braking devices of all the housing units 30 are released temporarily to make the housing units 30 slide down by gravity along the housing track 12 for a distance of one housing unit 30, and then the positioning protrusions 32 are moved into the positioning recesses 1221 again.

During the movement, the housing unit 30 that is at the lowest position slides to the temporary track 13. With reference to FIG. 6, the transverse moving part 23 moves the temporary track 13 and said housing unit 30 into the elevatable plate 21. With reference to FIG. 7, then the vertical moving part 22 moves up the elevatable plate 21, the temporary track 13, and said housing unit 30 to the top of the structure body 11. With reference to FIG. 8, the transverse moving part 23 moves the temporary track 13 and said housing unit 30 into the exit plate 116.

With reference to FIG. 9, finally, the positioning protrusions 32 and the braking device of said housing unit 30 are released again to make said housing unit 30 slide into the housing track 12.

At this time, the housing unit 30 originally at the lowest position is moved to become the highest housing unit 30, and the rest of the housing units 30 are slid down spirally for a distance of one housing unit 30.

Accordingly, the present invention achieves the change of positions, heights, and angles of the housing units 30, and residents in the housing units 30 can see different views along with the rotation cycle of the building.

The change of the position as described above may be programmed at a regular or predetermined timeline, such as every multiple hours, every day, every week and so on.

Figure 12:
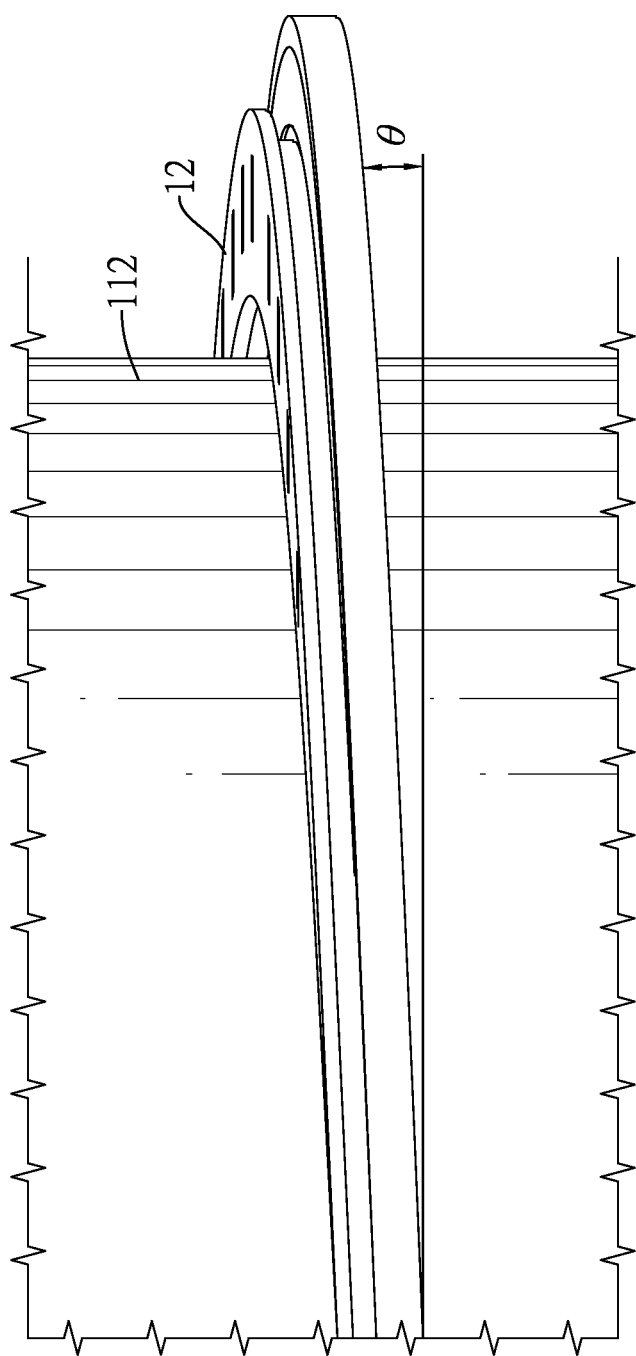
FIG. 12 is a schematic view of the building with rotating housings in FIG. 1, showing a spiral angle θ of the housing track.

In the preferred embodiment as shown in FIG. 12, a spiral angle θ of the housing track 12 is about 2.867 degrees (FIG. 12 is only for showing the position of 0, and the angle in FIG. 12 is schematic), and a weight of each housing unit 30 is about 130 tons. Then, in such a circumstance, the housing unit 30 slides down at a velocity about 4.752 m/s, and five roller sets 31, twenty disc brakes and five positioning protrusions 32 are sufficient.

In a preferred embodiment, a sensor system is mounted on the structure body 10 and the housing units 30, and is electrically connected to and controlled by the control system. The sensor system can identify positions of the housing units to determine when to actuate or release the braking systems, thereby controlling the braking device to guide the housing unit 30 to slide to the next position accurately.

In a preferred embodiment, a utility system is mounted on the structure body 10 and the housing units 30, to supply water, gas, and electric power from the structure body 10 to each of the housing units 30 via pipelines. Before the housing unit 30 is going to slide, said pipelines are closed and are retracted back from the housing units. After the housing units 30 slide to the next position, said pipelines reconnect to the newly located housing units 30. In addition, each of the housing units 30 also has an individual utility system to temporarily control utility supply when the housing units 30 are sliding.

Figure 13:
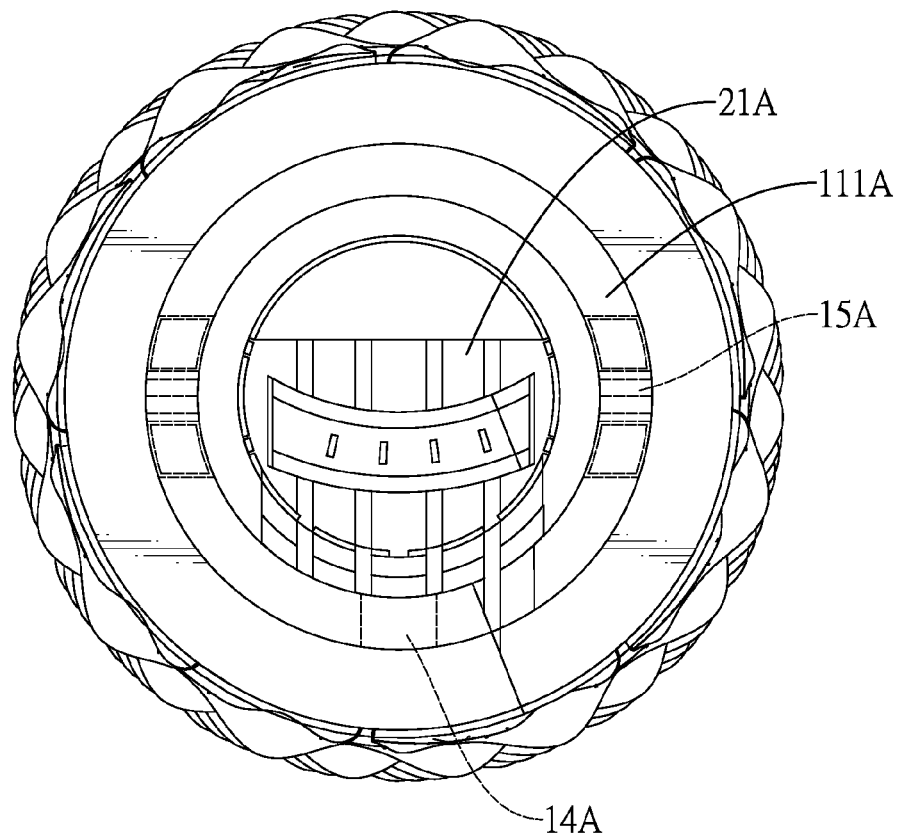
FIG. 13 is a top view of another embodiment of a building with rotating housings in accordance with the present invention, showing emergency gates and emergency stairs.

In case of emergency, such as power blackout, the control system automatically shuts down and locks all the housing units 30 to prevent the housing units 30 from sliding, and all the doors are opened to allow residents to evacuate. In addition, with reference to FIG. 13, multiple emergency gates 14A are vertically arranged apart from each other on the inner surrounding wall 111A to communicate the elevatable plate 21A (a space inside the inner surrounding wall 111A) and the corridors (a space outside the inner surrounding wall 111A) for evacuation, and emergency stairs 15A are mounted in the inner surrounding wall 111A for evacuation.

In the building of the present invention, the main structure 10 is built on the construction site, and the housing units 30 are built in the factory. Both of them can be built simultaneously. After the main structure 10 (including the installation of the moving device 20) and the housing units 30 are completed, the housing units 30 are transported to the main structure 10. Then, the housing units 30 can be moved to the top end of the housing track 12 one by one directly via the moving device 20, and does not need any cranes.

In the preferred embodiment described above, the moving device has only one transverse part, and the transverse part is moved up and down with the elevatable plate. However, in another preferred embodiment, the moving device also can have two transverse parts, which are respectively disposed adjacent to the top and the bottom of the structure body, and the moving rods are detachably connected to the temporary track.

In still another preferred embodiment, the structure body may be implemented without the outer surrounding wall. The floor is mounted on an outer surface of the inner surrounding wall, and is connected to the housing track.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A building with rotating housings comprising:
    a main structure having
        a structure body being circular and hollow, and having
            an entrance opening transversely formed through the structure body and adjacent to a bottom of the structure body; and
            an exit opening formed transversely through the structure body and adjacent to a top of the structure body;
        a housing track mounted on an outer surface of the structure body, and extending spirally upward from the entrance opening to the exit opening; and
        a temporary track moveably mounted in the structure body, and selectively connected to a top end or a bottom end of the housing track;
    a moving device mounted on the structure body, capable of moving the temporary track up and down in the structure body, and capable of moving the temporary track in and out through the entrance opening and the exit opening;
    multiple housing units moveably mounted on the housing track, and each of the housing units having
        a braking device mounted on a bottom of the housing unit, and capable of stopping the housing unit sliding down along the housing track; and
    a control system electrically connected to and controlling the moving device and the braking devices of the housing units;
    wherein when changing positions of the housing units, the moving device moves the temporary track out of the entrance opening, then the braking devices of all the housing units are released temporarily to make the housing units slide down by gravity along the housing track for a distance of one housing unit, and the housing unit that is at the lowest position slides to the temporary track, then the moving device moves the temporary track and said housing unit upward and out of the exit opening, and then the braking device of said housing unit is released temporarily to make said housing unit slide down to the housing track to be the highest housing unit.

2. The building with rotating housings as claimed in claim 1, wherein the structure body has
    an inner surrounding wall being circular;
    an outer surrounding wall being circular, mounted around the inner surrounding wall, and having
        multiple doors spirally arranged apart from each other, and respectively corresponding to doors of the housing units; and
    a floor mounted between the surrounding walls, extending spirally upward, and corresponding in position to the housing track.

3. The building with rotating housings as claimed in claim 1, wherein the structure body has
    an inner surrounding wall being circular; and
    a floor mounted on an outer surface of the inner surrounding wall, extending spirally upward, and connected to the housing track.

4. The building with rotating housings as claimed in claim 1, wherein the moving device has
    an elevatable plate vertically and moveably mounted in the structure body, and selectively corresponding in position to the entrance opening or the exit opening, wherein the temporary track is moveable on the elevatable plate;
    a vertical moving part mounted on the top of the structure body and having
        multiple cables connected to the elevatable plate to move the elevatable plate upward or downward; and a transverse moving part mounted in the structure body, and having
  at least one moving rod connected to the temporary track to transversely move the temporary track.

5. The building with rotating housings as claimed in claim 4, wherein
the structure body has
  an entrance plate disposed out of the entrance opening, selectively connected to the elevatable plate, and having
    multiple guiding tracks on a top surface of the entrance plate; and
  an exit plate disposed out of the entrance opening, selectively connected to the elevatable plate, and having
    multiple guiding tracks on a top surface of the exit plate; and
the elevatable plate of the moving device has
  multiple guiding tracks on a top surface of the elevatable plate, and selectively connected to the guiding tracks of the entrance plate or the guiding tracks of the exit plate.

6. The building with rotating housings as claimed in claim 1, wherein the structure body further has multiple elevators.

7. The building with rotating housings as claimed in claim 1, wherein each of the housing units has
multiple roller sets mounted on the bottom of the housing unit, spirally arranged apart from each other, and abutting on the housing track.

8. The building with rotating housings as claimed in claim 7, wherein
the housing track has
  two flanges respectively formed transversely on two sides of the housing track; and
each of the roller sets has two roller members respectively corresponding to the two flanges, and each of the roller members has
  three rollers respectively and rotatably abutting a top, an outer side, and a bottom of the corresponding flange.

9. The building with rotating housings as claimed in claim 7, wherein the braking device of each of the housing units has
multiple disc brakes mounted on the roller sets.

10. The building with rotating housings as claimed in claim 1, wherein
the housing track of the main structure has
  multiple positioning recess sets formed in a top of the housing track and spirally arranged apart from each other, each positioning recess set having
    at least one positioning recess; and
the housing units respectively correspond to the positioning recess sets, and each of the housing units has
  at least one positioning protrusion vertically and moveably mounted on the bottom of the housing unit, electrically connected to and controlled by the control system, mounted into the at least one positioning recess of the corresponding positioning recess set when the housing unit stops sliding, and moved out of said at least one positioning recess when the housing unit slides.

11. The building with rotating housings as claimed in claim 1, wherein each of the housing units has
a regenerative-braking device mounted on the housing unit, connected to the braking device, and capable of transferring the braking energy into electric power to charge a battery when the braking device is actuated.

12. The building with rotating housings as claimed in claim 11, wherein the regenerative-braking device of each of the housing units is capable of transferring the kinetic energy into electric power to charge the battery when the braking device is released and the housing unit is sliding.

13. The building with rotating housings as claimed in claim 1 further comprising a sensor system electrically connected to and controlled by the control system, mounted on the structure body and the housing units, and identifying positions of the housing units to actuate the braking systems.

14. The building with rotating housings as claimed in claim 2, wherein the structure body has
multiple emergency gates vertically arranged apart from each other on the inner surrounding wall to communicate a space inside the inner surrounding wall and a space outside the inner surrounding wall.

15. The building with rotating housings as claimed in claim 1, wherein the structure body has emergency stairs mounted in the structure body.

* * * * *